United States Patent [19]
Scully

[11] Patent Number: 6,012,008
[45] Date of Patent: *Jan. 4, 2000

[54] METHOD AND APPARATUS FOR PREDICTING A CRASH AND REACTING THERETO

[76] Inventor: Robert L. Scully, 10 Newman Ave., Verona, N.J. 07044

[*] Notice: This patent issued on a continued prosecution application filed under 37 CFR 1.53(d), and is subject to the twenty year patent term provisions of 35 U.S.C. 154(a)(2).

[21] Appl. No.: 08/918,826

[22] Filed: Aug. 26, 1997

[51] Int. Cl.$^7$ .............................. G06G 7/76; G06F 7/70
[52] U.S. Cl. .............................. 701/45; 701/36; 342/21; 342/107; 340/903
[58] Field of Search .............................. 701/36, 45, 46, 701/47, 48; 307/10.1; 180/282, 268; 280/735, 734; 340/436, 438, 439, 435, 903; 342/107, 71, 72, 128, 21, 94, 95; 356/5.08, 28, 5.07, 5.06

[56] References Cited

U.S. PATENT DOCUMENTS

| | | | |
|---|---|---|---|
| 3,735,398 | 5/1973 | Ross | 342/21 |
| 3,750,169 | 7/1973 | Strenglein | 342/21 |
| 3,760,414 | 9/1973 | Nicolson | 342/21 |
| 3,858,205 | 12/1974 | Ross | 342/21 |
| 5,249,157 | 9/1993 | Taylor | 340/903 |
| 5,291,262 | 3/1994 | Dunne | 356/5.06 |
| 5,359,404 | 10/1994 | Dunne | 356/5.06 |
| 5,521,696 | 5/1996 | Dunne | 356/5.07 |
| 5,767,766 | 6/1998 | Kwun | 340/436 |

*Primary Examiner*—Jacques H. Louis-Jacques

[57] ABSTRACT

A method and apparatus are described for predicting a crash and reacting thereto. Advantageously, the inventive apparatus is mounted on a vehicle and determines the time-to-impact for approaching obstacles that are within a limited distance from the host vehicle. The sensing distance from the vehicle is set by signal processing of reflected signals and rejection of all responses corresponding to a distance greater than the preset limiting value. The effect of the invention is the projection of a sensing envelope or barrier outwards from that portion of the vehicle provided with the invention. Intrusion into this envelope is sensed for appropriate action, so as to provide a warning of 10 to 40 milliseconds prior to a collision. The invention relies on time-of-flight measurement of preferably short infrared pulses to locate the obstacle. Multiple sensors are used to provide area coverage and to determine size and extent of the obstacle. For each sensor, an algorithm determines if the measured data indicates a collision. An additional algorithm is used to determine if the signals from all sensors collectively warrant a warning signal to vehicle safety systems. The system can be deployed in the front of the host vehicle for warning of frontal impact, and at the sides for warning of side impact. The system can also be used at the rear for backup obstacle warning. Advantageously, the systems for side, front and back are independent.

20 Claims, 4 Drawing Sheets

METHOD AND APPARATUS FOR PREDICTING A CRASH AND REACTING THERETO

BACKGROUND OF THE INVENTION

Present day automobile airbag safety systems rely on sensors to provide indication during a crash that the crash is of sufficient severity to warrant the deployment of an airbag. These sensors are reactive in the sense that they can only measure the response of the car during the actual physical crash. The sensor system however, must provide adequate warning to permit airbag deployment. A general rule of performance is the "5 inch—30 millisecond" rule: as a general norm, an airbag must be fully deployed after a travel of 5 inches in the front seat of the passenger compartment, where the travel is defined as the integration of the velocity change during the accident at the location of the passenger compartment. Since it takes approximately 30 milliseconds to deploy a passenger side airbag fully, the sensor system must provide an indication 30 milliseconds before the front seat has traveled 5 inches during the crash. In assessing this requirement it is helpful to recall that a vehicle traveling at 60 miles per hour is traveling at 88 feet per second or 0.88 feet per 10 milliseconds.

In addition to providing this advance indication, the sensor system must be capable of separating "must-fire" crashes from "no-fire" crashes, since not all crashes are severe enough to warrant the deployment of an airbag. Typically for a frontal crash, a velocity of 14 mph separates crashes requiring an airbag from those that do not require an airbag.

Sensors that are employed include mechanical, electro-mechanical and electronic devices. A mechanical sensor might involve the movement of a mass against a restraint arm. If the movement is sufficient, a spring loaded firing pin is released, puncturing a primer that initiates the airbag firing. In an electromechanical sensor, such as the ball-in-tube sensor, an electrical contact is closed if a magnetically restrained ball breaks free and closes the contacts of an external circuit. Both mechanical and electromechanical sensors are located near the point of initial contact, i.e. the front of the vehicle for frontal crashes. More than one sensor is usually required. In the mechanical and electromechanical sensor systems, the separation of "must-fire" crashes from "no-fire" crashes is accomplished with bias and damping parameters built into the sensor design, since these sensors are basically switches.

Electronic sensors rely on micromachined silicon capacitive or piezoresistive accelerometers. These sensors are typically located on a structural component close to the front of the passenger compartment, and measure the acceleration along the longitudinal axis of the car. The output of the electronic sensor is a voltage proportional to the acceleration along the axis of the vehicle. A microcontroller continually monitors the electronic sensor output and by means of a suitable algorithm determines if a crash is occurring and if it is severe enough to warrant airbag deployment.

Whereas mechanical and electromechanical systems typically require several sensors, some of which are located close to the front of the vehicle, and a system diagnostic unit, the electronic sensor can be configured as a single unit. Because of the advantages of this arrangement, the present industry trend is towards a single electronic sensor located on a structural component near the front of the passenger compartment.

The response of any sensing system is both vehicle specific and crash specific. While some vehicles and some crashes are relatively easy for the sensing system to diagnose, others are not. Two types of condition present particular difficulty: pole crashes and rough road conditions. In the case of pole crashes, it has been found that a pole can effectively slice through the front of the vehicle a considerable distance, using up valuable time, until the signature of a severe crash is recognized. In the latter case, rough roads can provide false indications of a crash.

For side impact crashes, the situation is more severe since the extent of the vehicle between the impacting object and the vehicle interior is much less than frontal crashes, providing less time for interpretation of data and for an airbag deployment decision.

In addition to these considerations, potentially adverse consequences of full airbag deployment when passengers are out of position, are leading to the development of "smart" airbag systems that deploy on the basis of occupant size and position. Pretensioning of seat belt restraints and integration of seat belt systems with "smart" airbag systems is also under development.

SUMMARY OF THE INVENTION

With these considerations in mind, an advance warning of a crash would be of value in preparing vehicle safety systems for an impact. A knowledge of where the contact will occur and the potential severity based on relative velocity would permit algorithms monitoring accelerometer based sensors to come to a decision at an earlier time during the actual crash. A predictive collision sensing system would provide this additional warning.

Further, a predictive collision sensing system could provide advance warning of a high velocity impact in a limited area, which is characteristic of a pole crash, as well as an all clear signal across the front of a vehicle supporting a rough road determination by the safety system diagnostic unit. A predictive collision sensing system could also provide significant value for a vehicle side impact system, where response time requirements for reactive sensors are severe. A predictive collision sensing system could provide an early alert to safety restraint and "smart" airbag systems currently under development.

The method and apparatus of the present invention projects a sensing envelope outwards from the surface of the vehicle and detects objects, either stationary or mobile, that intrude into this volume. This sensing envelope is kept as close to the surface of the vehicle as is possible, e.g. on the order of two to six feet and preferably about four feet, to eliminate the requirements of processing extraneous signals and to eliminate the generation of false indications. Nevertheless, the system of the present invention is capable of providing a warning approximately 10 to 40 milliseconds before collision occurs.

Preferably, the invention is implemented in a system comprising a control unit and multiple transmitting and sensing units that working together (1) locate approaching obstacles, (2) by time-of-flight analysis calculate the time-to-impact, and (3) provide indication of an imminent collision. This indication can then, for example, be used to actuate the airbags in a conventional airbag system.

Advantageously, the system is implemented using pulsed infrared laser transmitters; photodiode receiver circuits including amplification and signal conditioning; a digital clock for elapsed time measurement; and one or more digital signal processors or microprocessors for system control and algorithm realization.

Limiting the sensing distance to close distances, e.g. four feet, removes the necessity for target tracking that is a characteristic of present collision avoidance systems. The technique and system described herein recognizes that the closer the decision is made to the surface of the vehicle, the more reliable the indication. With a decision being made at a distance of approximately two feet, the probability of a contact not occurring for velocities that would require an airbag is virtually zero, since the deceleration necessary to prevent a collision is beyond the capabilities of the vehicle operator. For example, at a distance of 2 feet from an obstacle and with a vehicle moving at 14 miles per hour, the lowest velocity of impact requiring a frontal airbag, the braking required to prevent collision is larger than 3 g's. Even though a decision is not made until this close approach has been realized, the warning of 10 to 40 milliseconds that is provided by the system of the present invention is still of value to occupant safety systems.

The limitation of sensing distances in the preferred embodiment to approximately four feet has additional advantages that include increased probability of receiving reflected signals, even under adverse weather conditions. It also permits operation of the pulsed infrared laser within power limits that will meet eye safety requirements under all conceivable conditions.

BRIEF DESCRIPTION OF DRAWINGS

These and other objects, features and advantages of the invention will be more readily apparent from the following detailed descriptions of the invention in which.

DETAILED DESCRIPTION OF THE PREFERRED EMBODIMENTS

Figure 1:
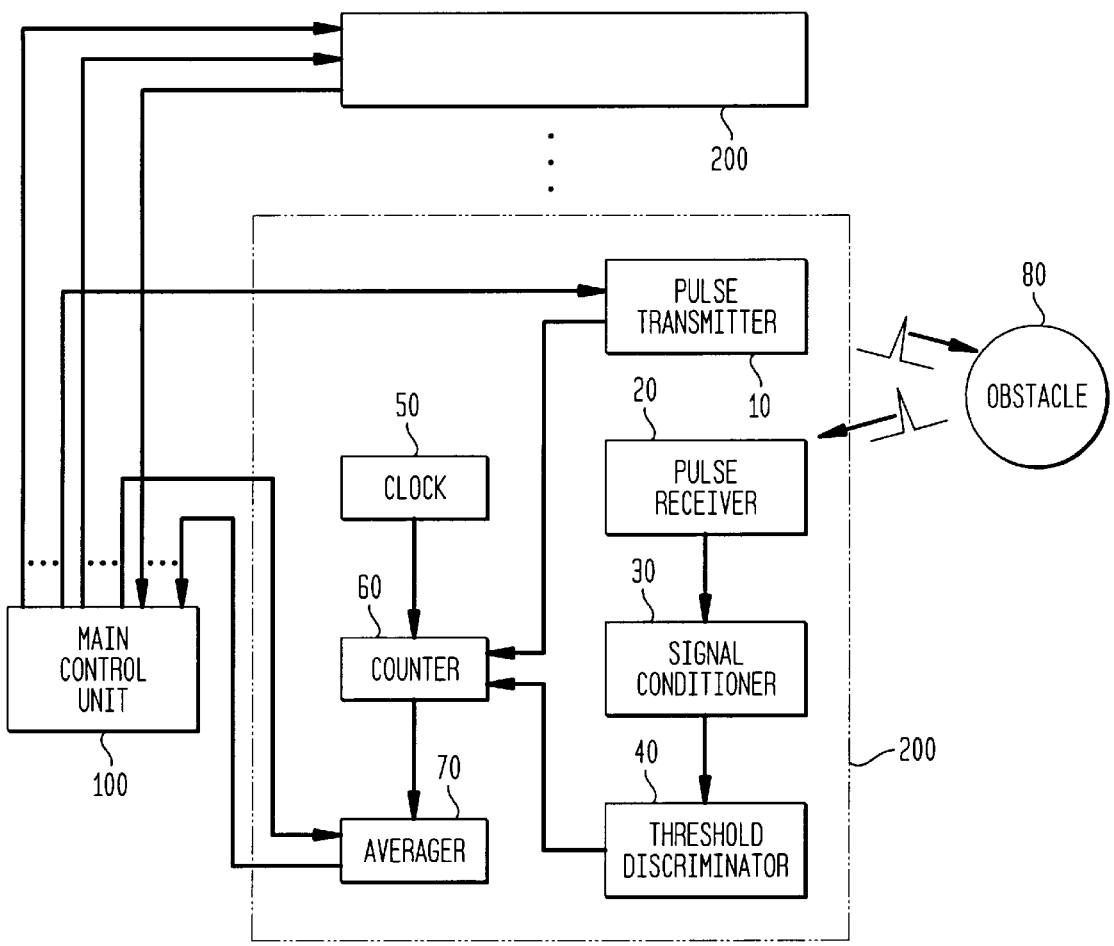
FIG. 1 is a block diagram illustrating a preferred embodiment of the invention.

As shown in FIG. 1, the system of the present invention comprises a main control unit 100 and at least one, and preferably several, rangefinder units 200. Each rangefinder unit comprises a pulse transmitter 10, a pulse receiver 20, a signal conditioner 30, a threshold discriminator 40, a clock 50, a counter 60 and an averager 70.

Control unit 100 sets the firing sequence of the individual units, stores data from the rangefinder units, provides analysis of individual unit response and overall system response, and provides alarm signals for external safety systems. Illustratively, control unit 100 is a conventional microprocessor, microcontroller, or a digital signal processor.

Each individual rangefinder unit 200 measures the distance to objects in its sensing direction through the measurement of the time-of-flight of a short infrared pulse. Each transmitter 10 projects a narrow beam infrared pulse and each receiver unit 20 detects reflected return pulses and provides initial amplification. Illustratively, each transmitter operates at a pulse repetition rate of 10 MHz so that one pulse is emitted every 100 nanoseconds. Return pulses are amplified and gain adjusted in signal conditioner 30, in order to provide a uniform return signal for further analysis. A threshold/discriminator 40 may optionally be employed for further return signal control. A digital clock 50 and a counter 60 are used to determine the time interval between the initiation of the transmitted pulse and the return of the reflected pulse. In particular, a signal from transmitter 10 causes counter 60 to begin counting clock pulses when an infrared pulse is emitted by the transmitter; and a signal from receiver 20 causes counter 60 to stop counting when the reflected infrared pulse is received by receiver 20. The count is then provided to data averager 70. Data averager 70 stores a rolling record of a predetermined number (e.g. ten) of the most recent time records that occur within a predetermined time window. Upon receipt of a new reading, the least recent value is dropped from the record.

In the preferred embodiment of the invention the time-of-flight is determined for pulses that are returned within a time window of approximately 8 nanoseconds from the initiation of the transmitted pulse. For return signals of greater time delays, the response is set to an arbitrarily high value by the averager 70, effectively indicating no collision when interpreted by system algorithms. Since the speed of light is approximately 1 foot per nanosecond, this effectively limits the unit of the preferred embodiment to a sensing distance of four feet. Advantageously, the return signal time window, the number of time records that are averaged, and the pulse repetition rate can be adjusted as needed for final system configuration. While it is difficult to anticipate all the system configurations in which my invention may ultimately prove useful, I do not at this time anticipate that in the context of an automobile the invention would be practiced with a sensing distance in excess of ten feet which corresponds to a time window of approximately 20 nanoseconds.

Advantageously, the sensing distance should be in the range of about two to six feet and preferably about four feet.

Advantageously, the transmitter unit 10 is an infrared laser diode that produces a fast rise time pulse. Pulse width is of the order of one nanosecond or smaller. A beam width of approximately 10 degrees is formed. At a distance of four feet from the transmitter the beam width is about 8 inches. Advantageously, the receiver 20 is a photodiode or avalanche photodiode, and the signal conditioner 30 produces a uniform response to reflected pulses that are received by the receiver.

The time reading constitutes the basic measured parameter that is used in system algorithms. The time measured by each rangefinder unit is read, stored and utilized by the control unit 100 on a periodic basis. Illustratively, for a seven unit system, successive rangefinder units are polled at a 10 microsecond interval, requiring 70 microseconds for system update.

Figure 2:
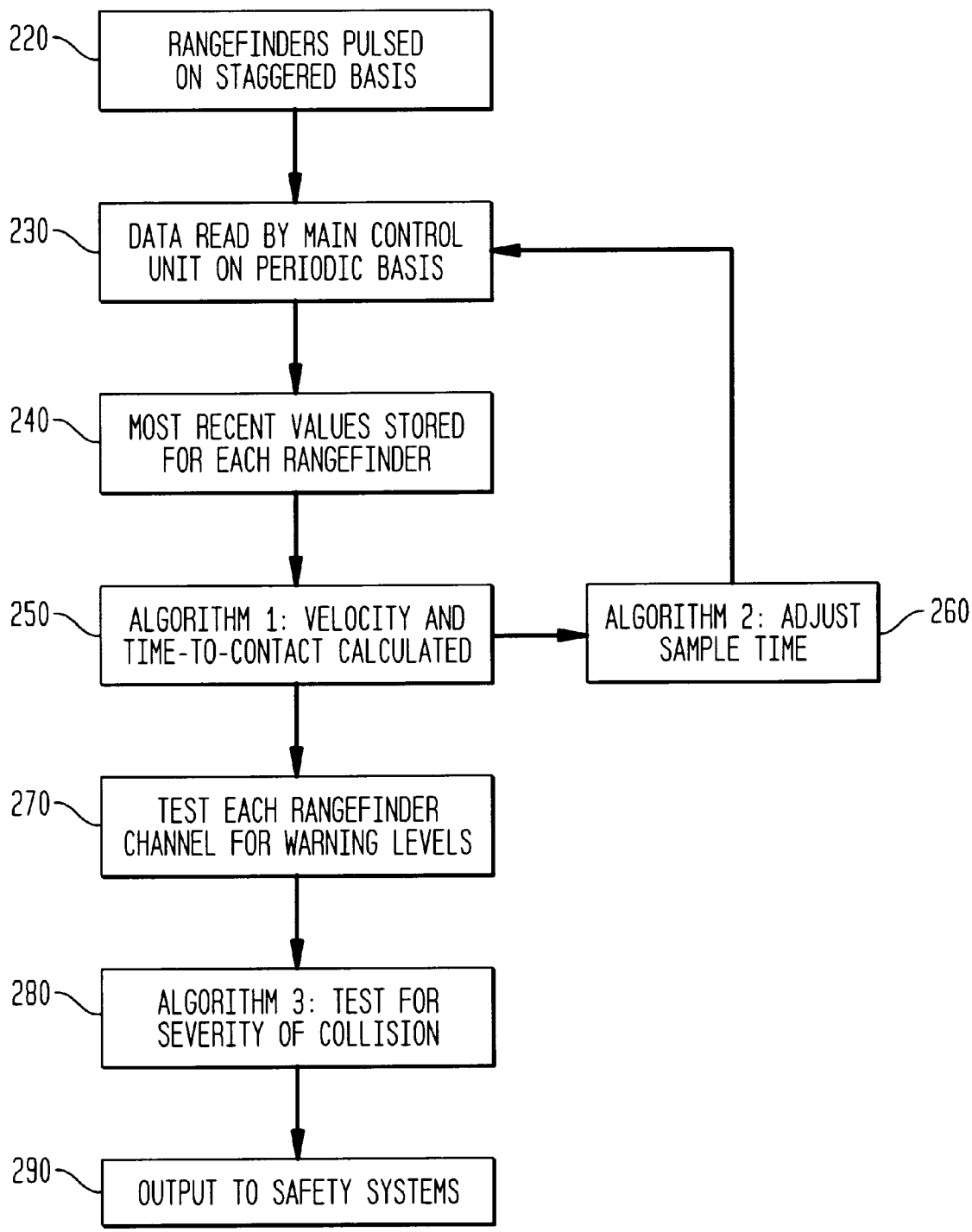
FIG. 2 is a flowchart depicting the processing of information within the system.

A flowchart depicting the operation of the system is set forth in FIG. 2. At step 220, control unit 100 triggers the pulse transmitter 10 of each rangefinder unit so that each transmitter operates at a pulse repetition rate of $10^7$ pulses per second. At step 230, control unit 100 polls averager 70 of each rangefinder unit to read its time data. This data is then stored at step 240 in memory at the control unit.

Next at step 250, the control unit determines the time to impact. Time-to-impact is given by $$\text{Time} = (\text{Distance})/(\text{Velocity})$$

where Distance is equal to one-half the most recent time measurement by the rangefinder multiplied by the speed of light and Velocity is determined by dividing the difference between the two most recent measurements of Distance by the time interval between these measurements. Combining these terms, we have Time=(½)c $t_N$]/{½c($t_{N-1}$-$t_N$)]/(interval between measurements)}

Time=(interval between measurements)/[($t_{N-1}$/$t_N$)−1]

where $t_N$ is the most recent time measurement by the rangefinder.

Figure 3:
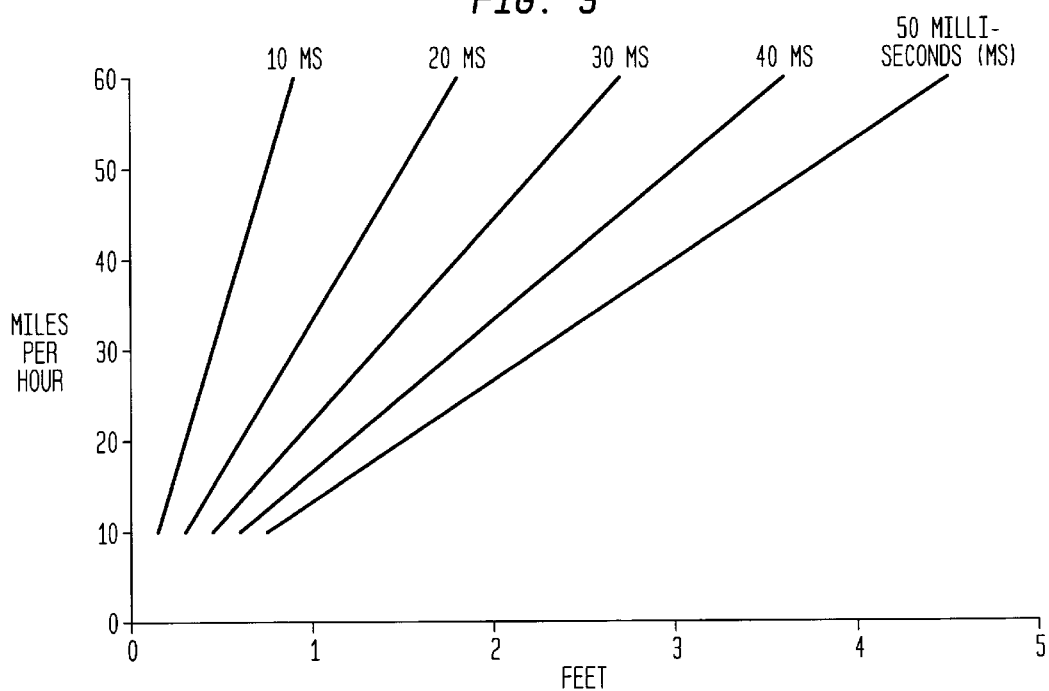
FIG. 3 is a plot depicting time-to-impact as a function of closing velocity with isochrones for specific times-to-impact.
Figure 4:
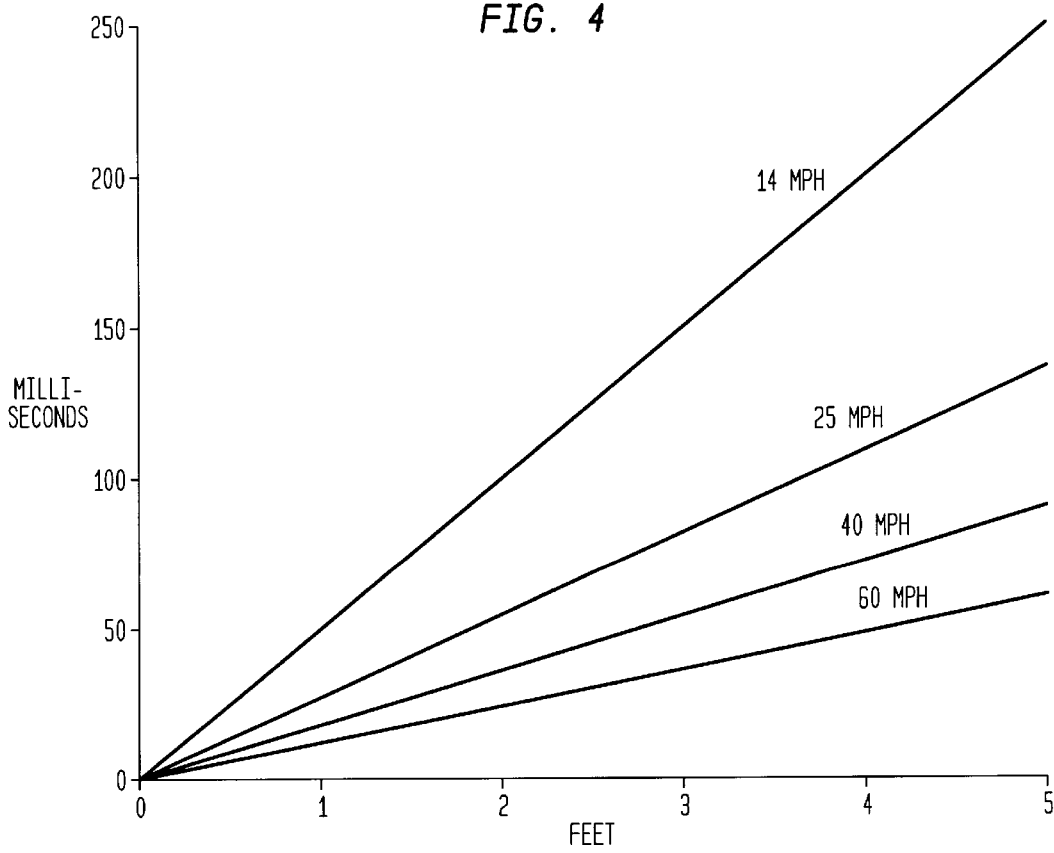
FIG. 4 is a plot depicting time-to-impact vs. distance for given closing velocities.

FIG. 3 illustrates the concept of time-to-impact as a function of distance, for various closing velocities. In order to provide a 20 millisecond warning before impact, FIG. 3 indicates that at 60 mph, a decision must be made and the warning issued when 1.75 feet remain between the colliding objects, and at 14 mph a decision must be made and the warning issued by 0.41 feet. When viewed as a function of range, as shown in FIG. 4, at a distance of 4 feet from impact, 45 milliseconds are available to reach a decision and issue a warning at velocities of 60 mph and 195 milliseconds are available at closing velocities of 14 mph. Illustratively, a decision that impact is about to occur can be made in about 10 to 20 milliseconds using a conventional microprocessor.

Advantageously, velocity is also calculated at step 250 and this resulting value is used at step 260 to adjust the time interval at which the rangefinder units are polled. In particular, the polling interval is adjusted so that the rangefinders are polled more frequently at higher velocities.

In addition, as indicated at step 270, the system advantageously has multiple warning or response levels. These levels are a function of time-to-impact. Accordingly, upon computing time-to-impact at step 250, the system then tests at step 270 if that time requires a specific warning or response and issues the warning or response if it does. Such warning might include various levels or types of audible alarms or flashing lights on the instrument panel. Different responses might include these warnings or activation of the braking system.

Next, at step 280 the system evaluates input from all the rangefinders to determine if a significant condition exists based on the time-to-impact, extent of the response of all units, and the sequence in which the individual units developed warning signals. If it determines that a serious collision is imminent, the system produces an output at step 290 that can be used to initiate deployment of the airbag system. Advantageously, the output is provided about 10 to 40 milliseconds before collision occurs.

Figure 5:
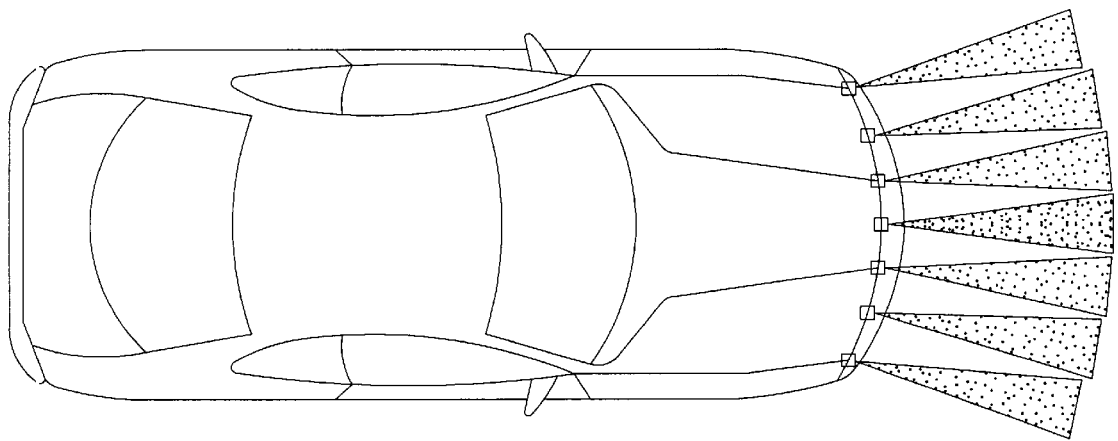
FIG. 5. is a schematic depicting the invention mounted on the front of a vehicle.

As illustrated in FIG. 5, a system of seven rangefinders under the control of a single control module is mounted on the front of the host vehicle. Sensor units are spaced approximately 8 inches apart along a contour line across the front of the vehicle at the approximate level of the head lamps. The beams project from the front of the vehicle forming a sensing barrier. Objects are detected within the volume out to about 4 feet from the sensor units. Target distance data from within this volume is collected by the transmission and reception of infrared pulses by transmitters 10 and receivers 20 and is analyzed by the system to determine if a collision will occur and to provide warning if required. A similar system might be mounted on the rear of the host vehicle.

A typical system algorithm for use with the forwardly armed rangefinders might provide levels of warning corresponding to a projected collision when 5 of the 7 units indicate velocity of impact above 14 mph; for 3 contiguous units indicating velocity of impact above 25 mph; and for a single unit indicating velocity of impact above 40 mph. In addition the location of the impacted area along the front of the vehicle can be factored into algorithms for interpreting accelerometer data, permitting an earlier decision from these units.

Figure 6:
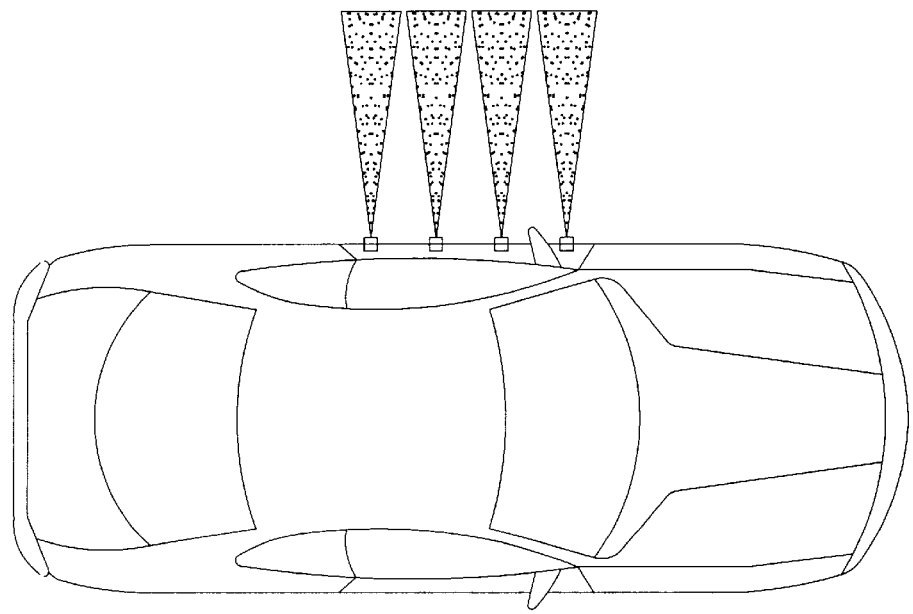
FIG. 6 is a schematic depicting the invention mounted on the side of the vehicle.

In FIG. 6, a system of four transmitter/receiver units is mounted on the side panel of the front doors of the host vehicle. The beams project out from the side of the vehicle forming a sensing barrier. Objects are detected in the volume that extends out to 4 feet from the side of the vehicle. Again, target data from within this volume is collected and analyzed to determine if a collision will occur and to provide warning of a collision approximately 10 to 40 milliseconds before it occurs.

In the embodiment of FIG. 6 a typical system algorithm would provide levels of warning corresponding to at least 3 units indicating velocity of impact at or above 14 mph; or 2 units indicating velocity of impact above 25 mph.

As will be apparent to those skilled in the art, my invention may be practiced in numerous variations of the specific embodiment disclosed herein. The operating parameters given are only illustrative and are intended to be conservative. Other parameters can be used.

In the preferred embodiment, the system determines time-of-flight and time-to-impact and assesses the situation on those determinations. As will be apparent, the relationship between distance, velocity and time makes it possible to use distance and velocity determinations to achieve the same result and such usage will be recognized as the equivalent of the use of time-of-flight and time-to-impact. For example, time-of-flight information can be stored as a time measurement or converted to a distance measurement by using the speed of pulses emitted by transmitter 10. And the running measurement that is stored by data averager 70 can be a running total or a running average. In either case the data is a measure of the location of the object that reflected the pulses. Similarly, while time-to-impact seems preferable to use to determine the need for an alarm or activation of an airbag, distance and velocity information is also available and conceivably might be more readily used in some algorithms. In all these cases, however, the data that is available for use by the system constitutes a measure of time-to-impact.

Other variations in the invention may be achieved by shifting more of the calculation and/or signal shaping effort from the rangefinder unit to the control unit. For example, the function of the data averager might readily be transferred to the processor. Other variations will be apparent to those skilled in the art.

What is claimed is:

1. A predictive crash sensing system comprising:
   a rangefinder comprising:
      a transmitter of pulses of optical electromagnetic radiation, having a pulse width on the order of ten degrees and a pulse duration on the order of one nanosecond or less;
      a receiver that receives radiation pulses transmitted from the transmitter and reflected by an object; and
      a timing device for determining a time-of-flight of pulses transmitted by said transmitter and received by said receiver where the time-of-flight is less than approximately 20 nanoseconds
   means for determining a time-to-impact from the time-of-flight of two pulses and the time between such pulses; and
   means for determining if a crash will occur from the time-to-impact information.

2. The system of claim 1 further comprising means for activating an airbag deployment system in response to a determination made from the time-to-impact information.

3. The system of claim 1 further comprising means for activating a braking system in response to a determination made from the time-to-impact information.

4. The system of claim 1 further comprising a data averager that maintains a running average of time-of-flight information.

5. The system of claim 1 further comprising a plurality of rangefinders wherein the means for determining if a crash will occur considers information from each rangefinder in making its determination.

6. The system of claim 1 further comprising a plurality of rangefinders wherein the means for determining if a crash will occur considers information from at least two rangefinders in making its determination.

7. The system of claim 1 wherein the time-of-flight is less than approximately 8 nanoseconds.

8. The system of claim 1 wherein the transmitter is an infrared transmitter.

9. The system of claim 1 wherein the transmitter is a laser diode.

10. The system of claim 1 comprising a plurality of transmitters mounted on the surface of a vehicle, each emitting pulses of electromagnetic radiation in a direction away from the vehicle.

11. The system of claim 1 wherein the transmitter is an infrared laser diode having a power output that complies with applicable eye safety requirements.

12. A method for predicting a crash comprising the steps of:

transmitting from a moving vehicle pulses of optical electromagnetic radiation having a pulse width on the order of ten degrees and pulse duration on the order of one nanosecond or less;

receiving said pulses at the moving vehicle after they are reflected from an object;

determining a time-of-flight for the received pulses where the time-of-flight is less then approximately 20 nanoseconds;

determining a time-to-impact from the time-off-light of two pulses and the time between such pulses; and determining if a crash will occur from the time-to-impact infromation.

13. The method of claim 12 further comprising the step of activating an airbag deployment system in response to a determination made from time-to-impact information.

14. The method of claim 12 further comprising the step of activating a braking system in response to a determination made from time-to-impact information.

15. The method of claim 12 wherein the time-of-flight is less than approximately 8 nanoseconds.

16. A method for predicting a crash comprising the steps of:

transmitting from a moving vehicle pulses of optical electromagnetic radiation having a pulse width on the order of ten degrees and pulse duration on the order of one nanosecond or less;

receiving said pulses at the moving vehicle after they are reflected from an object;

determining a measure of the distance to the object where the distance to the object is less than approximately ten feet (three meters);

determining a measure of time-to-impact from at least two measures of the distance and time between such measurements of distance; and determining if a crash will occur from the measure of time-to-impact.

17. The method of claim 16 further comprising the step of activating an airbag deployment system in response to a determination made from the measure of time-to-impact.

18. The method of claim 16 further comprising the step of activating a braking system in response to a determination made from the measure of time-to-impact.

19. A predictive crash sensing system comprising:

a plurality of transmitters mounted on front of a vehicle, each transmitter emitting pulses of optical radiation having a beam width of approximately ten degrees, said pulses having a pulse duration on the order of one nanosecond or less;

a plurality of receivers mounted on front of the vehicle, each receiver receiving pulses reflected by an object from one of the transmitters;

a timing device for determining a time-of-flight of pulses transmitted by one of said transmitters and received by one of said receivers where the time-of-flight is less than approximately 20 nanoseconds;

means for determining a time-to-impact from the time-of-flight of two pulses and the time between said pulses; and means for determining if a crash will occur from the time-to-impact information.

20. The crash sensing system of claim 19 wherein the transmitters establish a sensing perimeter within about ten feet of the front of the vehicle.

\* \* \* \* \*